United States Patent [19]

Kitaguchi et al.

[11] Patent Number: 4,591,716
[45] Date of Patent: May 27, 1986

[54] RADIOACTIVE CONCENTRATION MEASURING APPARATUS

[75] Inventors: Hiroshi Kitaguchi, Naka; Masaaki Fujii, Katsuta, both of Japan

[73] Assignee: Hitachi, Ltd., Tokyo, Japan

[21] Appl. No.: 629,044

[22] Filed: Jul. 9, 1984

[30] Foreign Application Priority Data

Jul. 8, 1983 [JP] Japan ................................ 58-123316

[51] Int. Cl.$^4$ .................................................. G01J 1/00
[52] U.S. Cl. .............................. 250/336.1; 250/432 R
[58] Field of Search ............... 250/336.1, 328, 428, 250/432 R, 431, 436

[56] References Cited

U.S. PATENT DOCUMENTS

| | | | |
|---|---|---|---|
| 2,738,426 | 3/1956 | Hurst | 250/432 R |
| 4,201,917 | 5/1980 | Graentzel | 250/431 |
| 4,495,420 | 1/1985 | Chudy et al. | 250/328 |

*Primary Examiner*—Janice A. Howell
*Attorney, Agent, or Firm*—Antonelli, Terry & Wands

[57] ABSTRACT

This invention relates to an apparatus for measuring the radioactive concentration of a radioactive material-containing liquid. In order to improve the measuring sensitivity of and miniaturize the apparatus, it includes a vertically-disposed outer cylinder, an inner cylinder disposed in and concentrically with the outer cylinder, a radiation detector disposed in the inner cylinder, a radioactive liquid feed means for supplying a radioactive material-containing liquid in the form of an annular current into an annular space between the inner and outer cylinders, a first cleaning water feed means for supplying a cleaning liquid along the inner surface of the outer cylinder, and a second cleaning water feed means for supplying a cleaning liquid along the outer surface of the inner cylinder. The cleaning water prevents the radioactive material from being deposited on the inner surface of the outer cylinder and the outer surface of the inner cylinder, and the measuring sensitivity of the apparatus from decreasing.

8 Claims, 9 Drawing Figures

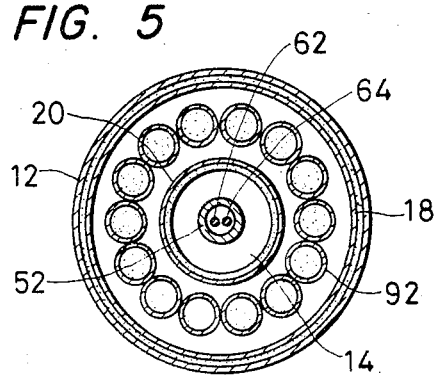
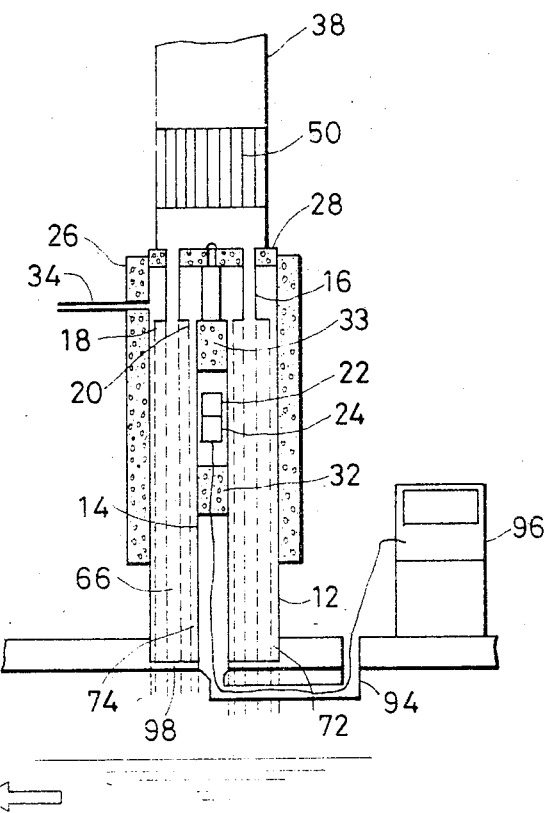

4,591,716

RADIOACTIVE CONCENTRATION MEASURING APPARATUS

BACKGROUND OF THE INVENTION

This invention relates to an apparatus for measuring the radioactive concentration of a radioactive fluid flowing in pipes, and more particularly to an apparatus for measuring the radioactive concentration of a low-level radioactive waste liquid discharged from a nuclear power plant.

In a nuclear power plant or the facilities in which a radioactive material is handled, it is necessary to measure the radioactive concentration of a liquid flowing in various kinds of pipes provided therein. In, for example, a nuclear power plant, the abnormal condition thereof is detected with reference to a measured radioactive concentration to prevent a fluid of a high radioactive concentration from being discharged to the outside thereof.

There is a known apparatus for measuring the radioactive concentration of a radioactive fluid in the pipes in a nuclear power plant, which is disclosed in Japanese Patent Laid-open No. 137595/1977.

In this apparatus, a measuring pipe through which a waste liquid which contains a radioactive material to be measured, flows is vertically disposed. The waste liquid is passed through the measuring pipe along the axis thereof by the force of gravity in such a manner that the waste liquid does not contact the inner surface thereof. The cleaning water is also introduced into the measuring pipe along the inner surface thereof to prevent the radioactive material from being accumulated thereon. A radiation detector is provided outside the measuring pipe and adapted to measure the radioactive concentration of the waste liquid as the detector is not in contact with the measuring pipe.

In order to measure the low-level radioactivity with this type of apparatus, it is necessary to improve the sensitivity thereof. There is a known apparatus made with a view to meeting this requirement, which is disclosed in Japanese Patent Laid-open No. 46177/1982. In this apparatus, a plurality of detectors are provided around a measuring pipe to measure the radioactive concentration of a fluid flowing therethrough. There the dimensions of the apparatus increase greatly.

SUMMARY OF THE INVENTION

An object of the present invention is to provide a radioactive concentration measuring apparatus which is free from the above-mentioned problems and which has small dimensions and a high sensitivity.

In order to improve the radiation measuring sensitivity of this type of apparatus, it is important to minimize a distance between an object to be measured and a radiation detector, and improve the geometrical efficiency which is determined by the geometry of an object to be measured and a radiation detector. The present invention has been achieved on the basis of the discovery that the sensitivity of a radioactive concentration measuring apparatus can be improved greatly by reversing the geometry, which is employed in a conventional apparatus of this kind, of an object to be measured and a radiation detector, i.e. disposing a radiation detector in the central portion of a measuring pipe, and introducing a liquid, which contains a radioactive material, an object to be measured, into the measuring pipe in such a manner that the liquid flows around the radiation detector in the downward direction.

The apparatus according to the present invention consists of an outer cylinder, an inner cylinder disposed in the outer cylinder, a radiation detector provided in the inner cylinder, and a means for supplying a radioactive material-containing liquid annularly into a space between a cleaning liquid flowing downward along the inner surface of the outer cylinder and a cleaning liquid flowing downward along the outer surface of the inner cylinder.

BRIEF DESCRIPTION OF THE DRAWINGS

FIG. 5 is a sectional view, which corresponds to FIG. 2, of another embodiment of the radioactive concentration measuring apparatus according to the present invention;

FIG. 6 is a sectional view of still another embodiment of the radioactive concentration measuring apparatus according to the present invention;

DESCRIPTION OF THE PREFERRED EMBODIMENTS

Figure 1:
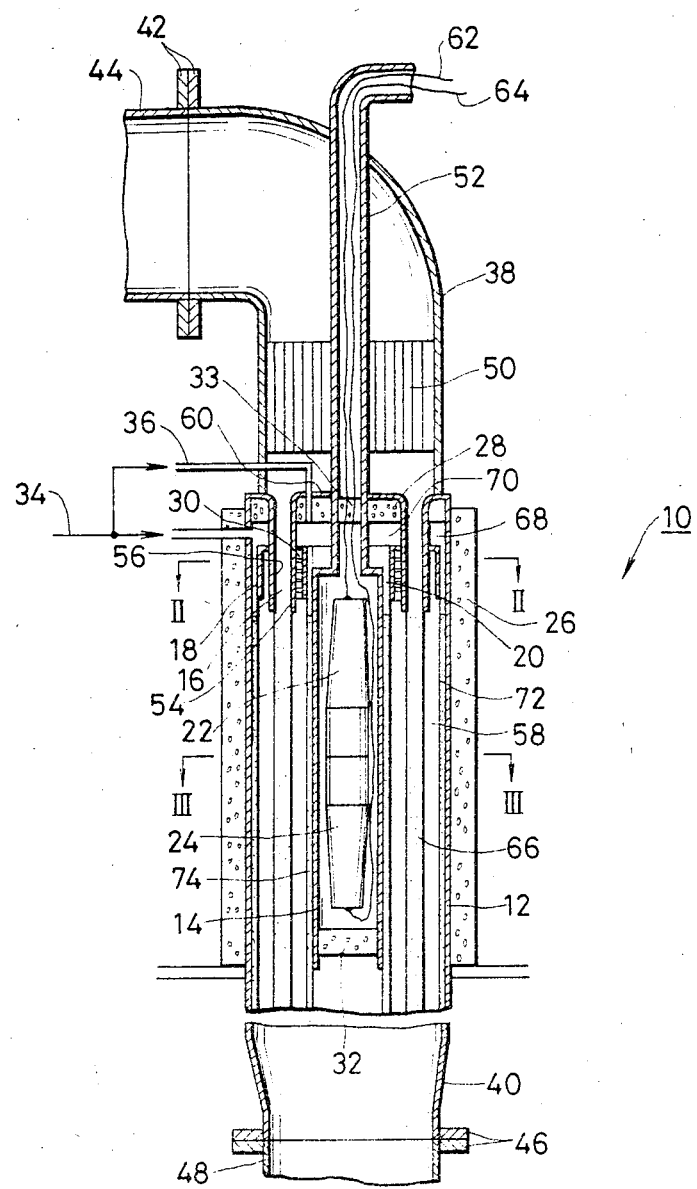
FIG. 1 is a sectional view of an embodiment of a radioactive concentration measuring apparatus according to the present invention.

FIG. 1 shows an embodiment of a radioactive concentration measuring apparatus according to the present invention. An apparatus 10 for measuring the radioactivity of the waste water consists basically of an outer cylinder 12, an inner cylinder 14, a ring type waste water nozzle 18, a ring type cleaning water nozzle 20, radiation detectors 22, 24, radiation shielding members 26, 28, 30, 32, 33, and cleaning water feed pipes 34, 36.

Figure 2:
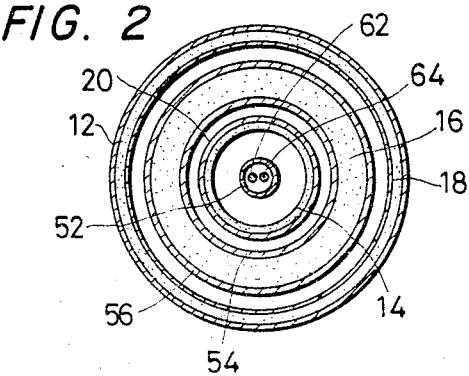
FIG. 2 is a sectional view taken along the line II—II in FIG. 1.

A waste water introducing pipe 38 is connected to the upper end surface of the outer cylinder 12, while a waste water discharge pipe 40 is connected to the lower end of the outer cylinder 12. The waste water introducing pipe 38 is joined to a waste water pipe 44 via flanges 42, and the waste water discharge pipe 40 to a waste water pipe 48 via flanges 46. A current-setting member 50 is provided in the waste water introducing pipe 38. The inner cylinder 14 is fixed to an instrumented pipe 52. The instrumented pipe 52 extends through the upper end wall of the outer cylinder 12 and the waste water introducing pipe 38, and is fixed to the same cylinder 12 and pipe 38. The outer and inner cylinders 12, 14 are concentrically disposed. The waste water nozzle 16 consisting of inner and outer tubes 54, 56 is disposed concentrically with the outer and inner cylinders 12, 14 and joined to the upper end surface of the outer cylinder 12. The lower end portion of the waste water nozzle 16 is inserted into an annular clearance 58 formed between the outer and inner cylinders 12, 14. The outer cleaning water nozzle 18 is fixed to the outer circumferential surface of the outer tube 56 of the waste water nozzle 16 to form a narrow, annular clearance between the same nozzle 18 and outer cylinder 12. The inner cleaning water nozzle 20 is fixed to the inner circumferential surface of the inner tube 54 of the waste water nozzle 16 to form a narrow, annular clearance between the same nozzle 20 and inner cylinder 14. The radial positional relation between the outer cylinder 12, inner cylinder 14, waste nozzle 16, outer cleaning water nozzle 18 and inner cleaning water nozzle 20 is as shown in FIG. 2. The cleaning water feed pipe 34 is joined to the portion of the side wall of the outer cylinder 12 which is higher than the upper end of the outer cleaning water nozzle 18. A branch pipe 36 extending from the cleaning water feed pipe 34 is joined to an upper end wall 60 fixed to the inner tube 54 in the waste water nozzle 16. A pair of radiation detectors 22, 24 are provided in the inner cylinder 14. The wires 62, 64 connected to the radiation detectors 22, 24, respectively, are taken out to the outside through the instrumented pipe 52.

The outer circumferential surface of the outer cylinder 12 is surrounded by a radiation shielding member 26. A radiation shielding member 28 is provided in an upper end portion of the interior of the outer cylinder 12. A radiation shielding member 30 is provided between the inner tube 54 in the waste water nozzle 16 and the inner cleaning water nozzle 20, and the radiation shielding member 32 in the portion of the interior of the inner cylinder 14 which is below the radiation detector 24. The radiation shielding member 33 is provided in the portion of the interior of the instrumented pipe 52 which is in the same level as the radiation shielding member 28. The wires 62, 64 extend through the radiation shielding member 33. The radiation shielding member 26 is adapted to prevent the background radiation from entering the apparatus 10 from the outside. The radiation shielding members 28, 33 are adapted to prevent the background radiation, which occurs due to the radioactive material accumulated on the surfaces of the waste water introducing pipe 38 and current-setting member 50, from reaching the radiation detectors 22, 24. The radiation shielding member 30 is adapted to prevent the background radiation, which occurs due to the radioactive material accumulated on the inner surface of the waste water nozzle 16, from reaching the radiation detectors 22, 24.

Figure 3:
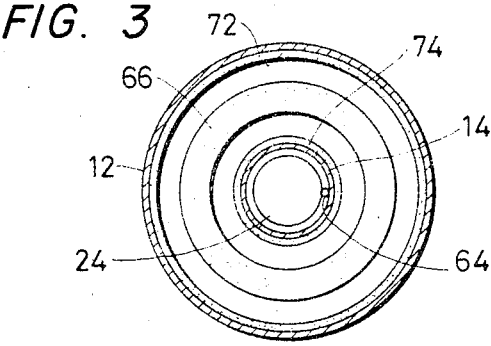
FIG. 3 is a sectional view taken along the line III—III in FIG. 1.

The waste water containing a radioactive material is introduced into the waste water pipe 44 and waste water introducing pipe 38 to be subjected to the current adjustment by the current setting member 50 and then supplied to the waste water nozzle 16. The waste water is then ejected from the waste water nozzle 16 into the annular clearance 58 to flow in the form of an annular water current 66. The cleaning water is introduced from the cleaning water feed pipe 34 and branch pipe 36 into the spaces 68, 70 provided in the portions of the interior of the outer cylinder 12 which are above the upper ends of the outer and inner cleaning water nozzles 18, 20. The cleaning water reaching the spaces 68, 70 is ejected from the outer and inner cleaning water nozzles 18, 20 into the annular clearance 58. The outer cleaning water nozzle 18 is adapted to eject the cleaning water in the form of a film-like water current 72 onto the whole of the inner circumferential surface of the outer cylinder 12. The film-like water current 72 flows down along the inner surface of the outer cylinder 12 to cover the whole thereof as shown in FIG. 3. The inner cleaning water nozzle 20 is adapted to eject the cleaning water in the form of a film-like water current 74 onto the whole of the outer circumferential surface of the inner cylinder 14. The film-like water current 74 flows down along the outer surface of the inner cylinder 14 as shown in FIG. 3, to cover the whole thereof. The annular waste water current 66 flows down between the film-like water currents 72, 74 as shown in FIG. 3. The clearances exist between the annular current 66 and film-like current 72 and between the annular current 66 and film-like current 74, and the portion of the annular current 66 which corresponds to the radiation detectors 22, 24 does not directly contact the film-like currents 72, 74. The film-like currents 72, 74 are mixed with the annular waste water current falling in the waste water discharge pipe 40. The resultant waste water flows from the waste water discharge pipe 40 into the waste water pipe 48.

Even when the particles of the waste water in the annular current 66 ejected from the waste water nozzle 16 fly toward the inner surface of the outer cylinder 12 and the outer surface of the inner cylinder 14, they are carried away by the film-like water currents 72, 74. Accordingly, the deposition and accumulation of a radioactive material on the inner surface of the outer cylinder 12 and the outer surface of the inner cylinder 14 can be prevented. Especially, when the waste water starts and stops being supplied, the annular current 66 tends to be disordered and contact the inner surface of the outer cylinder 12 and the inner surface of the outer surface of the inner cylinder 14. However, owing to the flow of the film-like water currents 72, 74, the deposition and accumulation of a radioactive material on the inner surface of the outer cylinder 12 and the outer surface of the inner cylinder 14 can be prevented.

Figure 4:
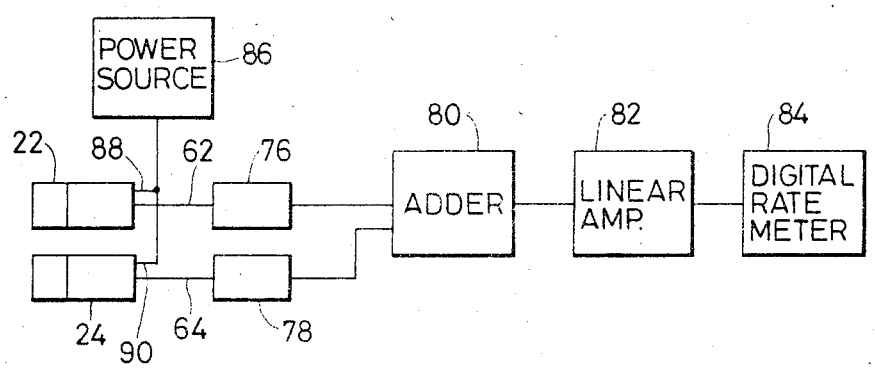
FIG. 4 is a block diagram of a signal processing circuit for the radioactive concentration measuring apparatus shown in FIG. 1.

While the waste water is supplied into the apparatus 10, the radiation detectors 22, 24 detect the radioactive level thereof. The signals representative of the detected and measured radioactivity are inputted into preamplifiers 76, 78 through the wires 62, 64 as shown in FIG. 4. The output signals from the preamplifiers 76, 78 are inputted into an adder-amplifier 80, and then into a digital rate meter 84 through a linear amplifier 82. The electric power is supplied from a power source 86 to the radiation detectors 22, 24 through wires 88, 90. The digital rate meter 84 is adapted to determine radioactive concentration of the waste water in the form of an annular current 66 on the basis of an input signal. This radioactive concentration is determined by subjecting an actual measurement value to conversion using the radioactive concentration conversion factors, which are determined on the basis of the measurement values of a waste water current the radioactive concentration of which is known well. In another method of determining this radioactive concentration, a reference radiation source having the same shape as the waste water current is provided around the radiation detectors to determine the conversion factors, which are used for the object calculation.

In this embodiment, the waste water flows around the radiation detectors 22, 24 as is clear from FIG. 3. Accordingly, the geometry of one radiation detector in this embodiment and the annular current 66 is improved about 2.5-2.8 times as compared with the geometrical efficiency of one radiation detector in a conventional apparatus of this kind. Furthermore, the radiation detectors 22, 24 can be disposed in positions close to the inner surface of the inner cylinder, so that a distance between the waste water current and radiation detectors becomes not more than a half of the corresponding distance in a conventional apparatus of this kind. Owing to the reduction by half of such a distance, the radioactivity detecting sensitivity of this embodiment is improved four times according to the result of calculations made on the assumption that the radioactivity detecting sensitivity of this kind of apparatus increases in inverse proportion to the square of such a distance. However, since the practical object to be measured is not a spot radiation source, the magnifying power showing the degree of improvement of the radioactivity detecting sensitivity of this embodiment is a little smaller than four. It has been experimentally ascertained that the radioactivity detecting sensitivity of this embodiment is improved 2.8–3 times that of a conventional apparatus of this kind. In view of the above, it can be said that the measuring efficiency of this embodiment is improved not less than 5 times per one radiation detector as compared with that of a conventional apparatus of this kind. The radiation detecting sensitivity of this kind of apparatus can be improved 10 times by arranging two detectors in the vertical direction as concretely illustrated in FIG. 1, a sectional view of this embodiment.

This embodiment not only enables the measuring efficiency of the apparatus per one radiation detector to be improved to a great extent but also has the following additional effects. The diameter of the measuring portion of this apparatus including the radiation shielding members can be reduced to not more than a half of that of the corresponding portion of a conventional apparatus of this kind in which a radiation detector is disposed outside of a waste water current. This means that the volume of the measuring portion of the former apparatus can be reduced to not more than ¼ of that of the corresponding portion of the latter apparatus if the heights of these measuring portions are the same. Namely, the apparatus in this embodiment is miniaturized to a great extent. The number of radiation detectors employed in this embodiment is 1/5 of that in the apparatus disclosed in the above-mentioned Japanese Patent Laid-open 46177/1982, and, owing to the reduced dimensions, the quantity of the radiation shielding members used in the embodiment is reduced to about ¼ of that in this conventional apparatus. Also, the number of parts of the radiation measuring system in the embodiment is reduced to ¼-1/5 of that in the mentioned conventional apparatus, so that the reliability of the radiation measuring system of the embodiment can be improved greatly.

FIG. 5 shows another embodiment of the present invention. In this embodiment, the double cylinder type waste water nozzle 16 referred to in the description of the embodiment of FIG. 1 is substituted by a plurality of single tube nozzles 92 of a small inner diameter, which are arranged in the annular clearance concentrically with the inner cylinder 14. Accordingly, a plurality of waste water currents of a small diameter can be formed around the radiation detectors 22, 24. Namely, a plurality of waste water currents surround the radiation detectors, so that the effect identical with that of the previously-described embodiment can be obtained. The second embodiment is capable of effectively maintaining the stable passage of waste water through the measuring portion thereof with the waste water not contacting the radiation detectors, when the flow rate of the waste water is low.

FIG. 6 shows still another embodiment of the present invention. In this embodiment, the instrumented pipe 94 is joined to the lower surface of the inner cylinder 14. The wires 62, 64 extend through the instrumented pipe 94 to be taken out to the outside from a lower portion of the outer cylinder 12. The wires are connected to a radiation measuring unit 96, which has a circuit shown in FIG. 4. The inner cylinder 14 housing the radiation detectors 22, 24 is supported on the outer cylinder via a support bar 98. The support bar 98 contacts the annular current to be radiation-contaminated. The influence of this contamination upon the radiation detectors is prevented by the radiation shielding member 32. The radiation shielding construction in this embodiment is simpler than that in the embodiment of FIG. 1. Unlike the instrumented pipe 52 in the embodiment of FIG. 1, the instrumented pipe 94 does not cross the waste water at an inlet side of the measuring portion, so that the waste water is disordered little at the mentioned side of the measuring portion.

Figure 7:
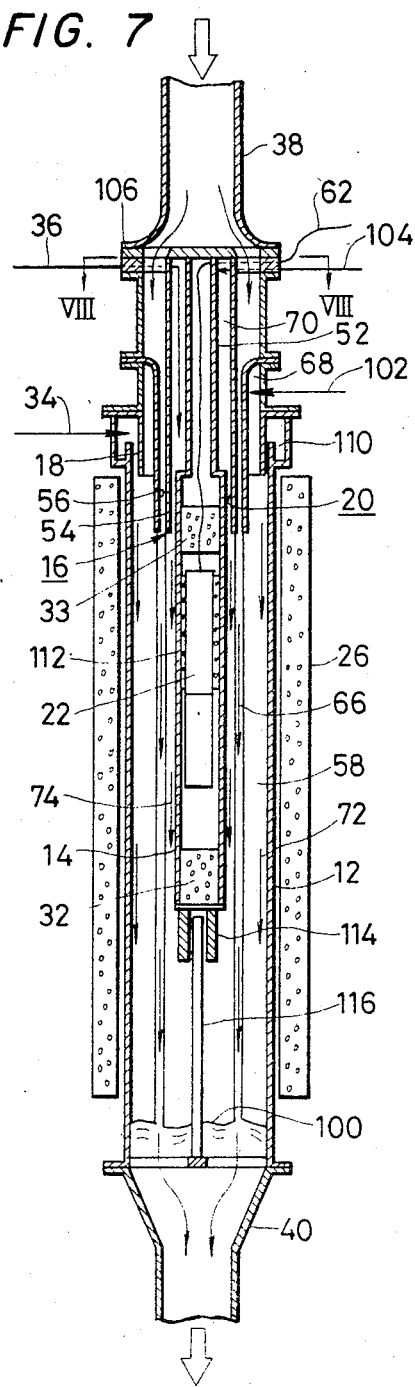
FIG. 7 is a sectional view of a further embodiment of the radioactive concentration measuring apparatus according to the present invention.
Figure 8:
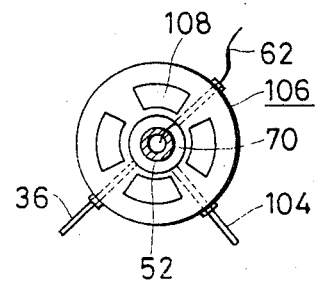
FIG. 8 is a sectional view taken along the line VIII—VIII in FIG. 7.

FIG. 7 shows a further embodiment of the invention, in which the lower end portion of the outer cylinder 12 is not opened into the atmospheric air. In the apparatus, in which the lower end portion of the outer cylinder 12 is not opened into the atmospheric air, the waste water resides in the section of the outer cylinder 12 which is in the measuring portion; there is the possibility that the feeding of the waste water without contacting the radiation detector cannot be maintained. Such an inconvenience is ascribable to the fact that a gas in the outer cylinder 12 is involved in the waste water to be transported downward and cause the interior of the outer cylinder 12 to be vacuous and the liquid level 100 therein to increase. This embodiment is constructed so as to deal with this phenomenon. In this embodiment, a gas is forcibly supplied from the gas feed pipes 102, 104 into a space between the annular current 66 and the film-like water current 72 flowing along the inner surface of the outer cylinder 12 and a space between the annular current 66 and the film-like water current 74 flowing along the outer surface of the inner cylinder 14. The gas is supplied at such a feed rate that corresponds to a rate at which the gas in the outer cylinder 12 is involved in and transported by the waste water. The gas feed pipe 104 is fixed to a member 106 as shown in FIG. 8, to supply a gas into the space 70. The member 106 has bores 108 for passing the waste water therethrough. A cleaning water feed pipe 36 is also fixed to the member 106, and a wire is inserted through the member 106 to be introduced into the instrumented pipe 52. The cleaning water supplied through the cleaning water feed pipe 34 is introduced into a cleaning water storage tank 110 and flows down as a film-like current 72 from the outer cleaning water nozzle 20.

Figure 9:
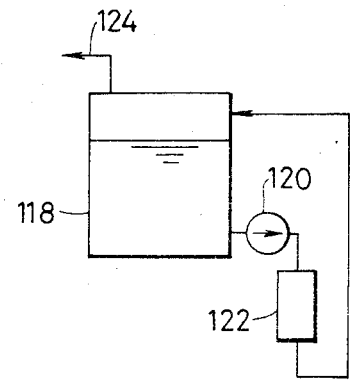
FIG. 9 is a diagram of a system to which the apparatus shown in FIG. 7 is applied.

This embodiment is provided with only one radiation detector 22, and an axially elongated scintillator is used therefor. A shield member 112 is provided around the radiation detector 22. A retainer member 114 is attached to the lower portion of the inner cylinder 14, and so constructed that the retainer member 114 supports the lower portion of the inner cylinder 14 on the central portion of the outer cylinder 12 via a guide rod 116. The axial lengths of the inner and outer tubes 54, 56, which constitute the waste water nozzle 16, are increased to omit the current-setting member 50 provided in the embodiment of FIG. 1. The radioactive concentration measuring apparatus of the embodiment shown in FIG. 7 can be installed in any part of a waste water pipe. Let us take the case of a nuclear power plant. This apparatus enables the radioactivity in the waste water in a building of a nuclear power plant, which is away from a waste water discharge port, to be monitored in the building. The radioactive concentration measuring apparatus 122 of this embodiment can also be installed in a closed loop in which a liquid in a tank 118 is circulated through a pump 120 as shown in FIG. 9. In this case, it is necessary that the tank 118 be provided with a gas-extracting pipe 124 for use in extracting a gas fed into the radioactive concentration measuring apparatus 122. In the embodiments described above, the film-like water current 72 on the inner surface of the outer cylinder and the film-like water current 74 on the outer surface of the inner cylinder 14 flow down constantly. These water currents 72, 74 can also be supplied in the following manner. The annular current 66 is disordered to cause the small particles of the water therein to fly onto the inner surface of the outer cylinder 12 and the outer surface of the inner cylinder 14 mostly when the supplying of the waste water is started and stopped. Even when the film-like currents 72, 74 are supplied at the time of starting and stopping the supplying of the waste water, and, even when the water currents 72, 74 are supplied at predetermined time intervals during a normal operation of the apparatus, the accumulation of a radioactive material on the inner surface of the outer cylinder 12 and the outer surface of the inner cylinder 14 can be prevented. This enables the quantity of the cleaning water in use to be reduced.

In the above-described embodiments, the waste water nozzle 16 is so formed that an annular current can be supplied through a space between the inner and outer tubes 54, 56. When the apparatus is installed in a certain position, the tubes 54, 56 may be formed elliptically to supply an elliptic current.

According to the present invention, the dimensions of a radioactive concentration measuring apparatus can be reduced greatly, and the measuring sensitivity thereof can be improved markedly.

What is claimed is:

1. A radioactive concentration measuring apparatus comprising a vertically-disposed outer cylinder, an inner cylinder disposed in said outer cylinder, a radioactive concentration measuring means disposed in said inner cylinder, a radioactive liquid feed means for supplying a radioactive material-containing liquid in the form of a substantially annular current into an annular clearance between said outer and inner cylinders, a first cleaning liquid feed means for supplying cleaning liquid along the inner surface of said outer cylinder, and a second cleaning liquid feed means for supplying cleaning liquid along the outer surface of said inner cylinder.

2. A radioactive concentration measuring apparatus according to claim 1, wherein said radioactive liquid feed means has inner and outer tubes disposed so as to form therebetween an annular clearance into which a radioactive material-containing liquid is supplied.

3. A radioactive concentration measuring apparatus according to claim 2, wherein said inner and outer tubes are concentrically-disposed, cross-sectionally circular tubes.

4. A radioactive concentration measuring apparatus according to claim 1, wherein said radioactive liquid feed means consists of a plurality of small-diameter tubes adapted to supply a radioactive material-containing liquid therethrough and disposed concentrically with said inner cylinder.

5. A radioactive concentration measuring apparatus according to claim 1, wherein said radioactive concentration measuring means has a plurality of axially arranged radiation detectors.

6. A radioactive concentration measuring apparatus according to claim 5, wherein said plural radiation detectors consist of two radiation detectors disposed in opposition to each other.

7. A radioactive concentration measuring apparatus according to claim 1, wherein said apparatus further includes a first gas feed means for supplying a gas into a space between said annular current of a radioactive material-containing liquid supplied from said radioactive liquid feed means and said cleaning liquid flowing down along the inner surface of said outer cylinder, and a second gas feed means for supplying a gas into a space between said annular current of a radioactive material-containing liquid and said cleaning liquid flowing down along the outer surface of said inner cylinder.

8. A radioactive concentration measuring apparatus comprising a vertically-disposed outer cylinder, an inner cylinder disposed in and concentrically with said outer cylinder, a radiation detector disposed in said inner cylinder, a radioactive fluid feed nozzle provided between said outer and inner cylinders, consisting of concentrically-disposed inner and outer tubes and adapted to introduce a radioactive material-containing fluid in the form of an annular current into an annular space between said outer and inner cylinders, an outer cleaning water nozzle for supplying cleaning water along the inner surface of said outer cylinder, an inner cleaning water nozzle for supplying cleaning water along the outer surface of said inner cylinder, a first gas feed means for supplying a gas into a space between said annular current of a radioactive material-containing fluid flowing down from said radioactive fluid feed nozzle and the cleaning water flowing down along the inner surface of said outer cylinder, and a second gas feed means for supplying a gas into a space between said annular current of a radioactive material-containing fluid and the cleaning water flowing down along the outer surface of said inner cylinder.

* * * * *